United States Patent [19]
Porcelli

[11] 3,779,429
[45] Dec. 18, 1973

[54] PLASTIC DISPENSING NOZZLE WITH A BALL VALVE

[75] Inventor: John C. Porcelli, Lincolnwood, Ill.

[73] Assignee: Federal Tool & Plastics, a Division of VCA Corporation, Chicago, Ill.

[22] Filed: Dec. 17, 1971

[21] Appl. No.: 209,253

[52] U.S. Cl. .................................. 222/500, 215/22
[51] Int. Cl. .............................................. B65d 5/72
[58] Field of Search .................... 222/207, 212, 213, 222/481, 491, 495, 496, 497, 500, 546, 547, 544; 215/21, 22, 27; 137/533.13, 533.15, 533.11

[56] References Cited
UNITED STATES PATENTS

| | | | |
|---|---|---|---|
| 3,179,300 | 4/1965 | Davidson et al. | 222/213 |
| 2,855,127 | 10/1958 | Lerner et al. | 222/212 X |
| 2,663,463 | 12/1953 | Benbury et al. | 222/546 |
| 2,690,278 | 9/1954 | Bacheller | 222/207 |
| 3,018,910 | 1/1962 | Unger | 215/22 |
| 3,278,089 | 10/1966 | Heemin et al. | 222/546 X |

Primary Examiner—Stanley H. Tollberg
Assistant Examiner—Larry Martin
Attorney—Max R. Kraus

[57] ABSTRACT

A plastic nozzle in combination with a closure cap in which the interior of the nozzle is provided with a valve cage or valve housing for retaining and supporting a ball valve to prevent entrance of foreign matter through the nozzle into the container when the ball valve is in its normal seated position, but which permits the discharge and dispensing of the material in the container when the container and nozzle are tilted or inverted for pouring position.

8 Claims, 5 Drawing Figures

PATENTED DEC 18 1973  3,779,429

PLASTIC DISPENSING NOZZLE WITH A BALL VALVE

BRIEF SUMMARY OF THE INVENTION

In the merchandising of certain products, such as brake fluids and the like, although it is equally applicable to other products, it is imperative that the nozzle be closed when same is in unused and/or normally upright position so that even when the cap for closing the nozzle is lifted to expose the entrance to the nozzle nothing can enter the container through the nozzle, for if any foreign matter found its way into the container it would contaminate the contents thereof, and in the case of brake fluids, when any contaminated brake fluid is introduced into the braking system of an automobile serious consequences could result, such as failure of the brake system to operate effectively.

An object of this invention, therefore, is to provide a dispensing nozzle with a ball valve which in unused or normal upright position seats on the valve seat in the nozzle and closes the nozzle opening into the interior of the container to prevent contamination or the introduction of any foreign material into the container.

Figure 1:
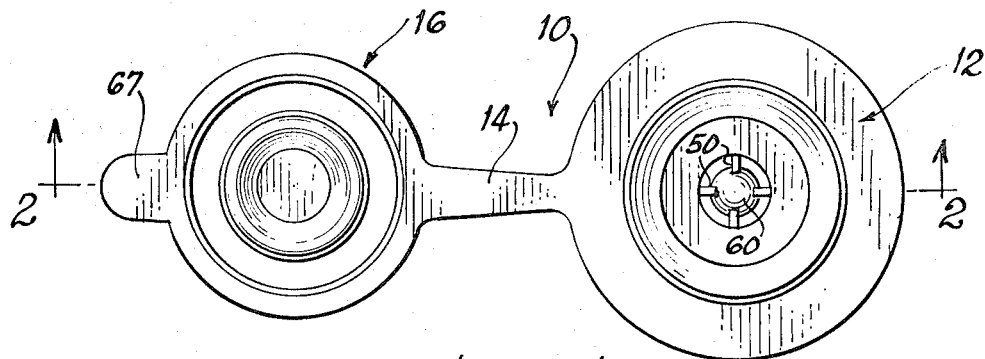
FIG. 1 is a top plan view of the closure with the cap in open position.

The closure unit generally indicated at 10 comprises a nozzle generally indicated at 12, a flexible hinge 14 extending therefrom and a cap or closure generally indicated at 16 connected thereto. The nozzle 12 includes a tubular body 18 which tapers or inclines downwardly to form a tapering wall 19 and then extends outwardly to form an annular enlargement 20. The annular enlargement is provided with an annular groove or recess 22 which is open at the bottom to receive the annular upturned or flanged portion 24 of the top wall 26 of the container surrounding the opening 28 of the top wall 26. The flange portion 24 of the container is permanently interlocked with the groove or recess 22 of the nozzle 12 to permanently secure the nozzle to the container. The tubular body 18 has a short annular portion 30 at the lower end which extends into the interior of the container. The internal diameter of the nozzle is greater at the lower end than at the upper or outlet end.

The upper or mouth portion of the nozzle 12 has an annular or peripheral bead or lip 32 and the lower portion of the bead 32 tapers inwardly as at 34. Upwardly of the bead 32 the nozzle tapers inwardly and then slightly outwardly to terminate in an annular upper edge 36. The inside wall adjacent the upper edge is beveled as at 38.

Figure 2:
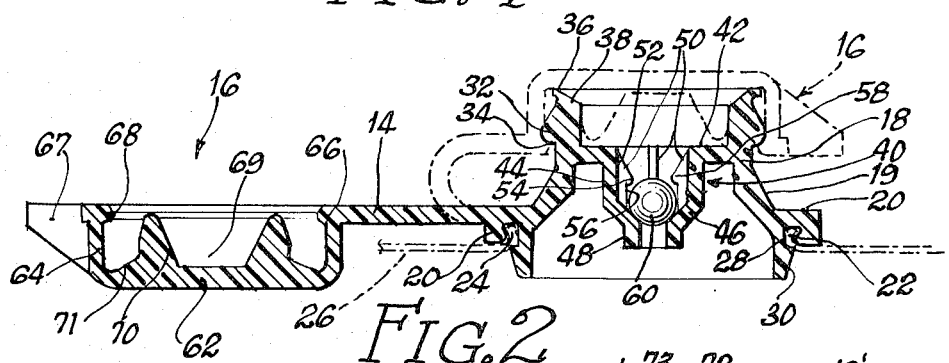
FIG. 2 is a sectional view taken on line 2—2 of FIG. 1 and showing in dotted lines the cap in closed position with respect to the closure.

In the embodiment shown in FIGS. 1 and 2, the valve cage or valve housing, generally indicated at 40, is formed integrally as part of the nozzle 12, whereas in the other embodiments the valve cage or valve housing is separately formed and secured to the nozzle. As shown in FIGS. 1 and 2, the nozzle 12 is formed to provide an annular horizontally extending flat portion 42 extending transversely of the interior of the nozzle below the top thereof, with a centrally downwardly depending or extending tubular portion 44 which extends inwardly to form a conical-shaped ball valve seat 46 and which continues downwardly from said conical valve seat to form a tubular portion 48 which forms the lower end of the valve cage or valve housing.

Extending within the tubular portion 44 of the valve cage and integrally formed therewith is a plurality (preferably four) of equally spaced inwardly and vertically extending ribs 50 which extend from the top of the valve housing to the conical valve seat 46, as best seen in FIG. 2. The ribs 50 each have a downwardly and inwardly inclined top surface 52 which then inclines outwardly as at 54 and then continues vertically as at 56 to form the lower end of the rib. At the juncture between the inwardly inclined top surface 52 and the outwardly inclined surface 54 there is formed a projection or shoulder 58 which serves to trap the ball valve 60 after it has been inserted in the valve cage or valve housing.

The ball valve 60 is preferably a metal ball bearing, although it may be made of other material if desired. The ball valve is initially inserted from the top or open end of the spout and as it is pushed down inwardly into the valve housing 40 it will deflect the ribs 50 to permit passage of the ball valve past the shoulders or projections 58 until the ball passes same and comes to seat or rest on the conical surface 46 of the valve cage or housing, as shown in FIG. 2. When the container and the spout are in the normal upright position, as shown in FIG. 2, the ball valve 60 seats on the conical valve seat 46 to close the opening or bore at the lower end of the valve cage and thus will provide an effective seal into the interior of the container from the top of the nozzle.

When the container with the nozzle thereon is inverted from the upright position shown in FIG. 2, the ball valve 60 will by gravity move from the conical valve seat 46 to engage the shoulders or projections 58 on the ribs 50 which will limit the outward movement of the ball valve and when in this position the material within the container will pass through the valve cage between the ribs so that the material can be poured through the nozzle. Thus, as the ball rests in the position shown in FIG. 2, the ball valve completely seals the conical valve seat so that nothing can get into the interior of the container as it is completely blocked by the seated ball valve. When the nozzle and the container are inverted as in pouring, the ball valve is moved to a position to permit the liquid or fluid to be poured from the container.

The cap or closure 16 is connected to the nozzle 12 by the flexible connecting strip or hinge 14 and thee hinge extends from the enlargement 20 of the nozzle outwardly to the bottom of the cap or closure. The cap or closure 16 has a substantially flat top 62 and a depending outer cylindrical side wall or skirt 64 provided with a thickened annular wall portion 66 at the bottom thereof to which the hinge connects. A forward extension 67 is provided at the front thereof and same projects from the cap for manual engagement for the purpose of lifting the cap from the nozzle.

Extending radially inward from the cylindrical side wall 64 of the cap is an annular lip 68 which engages the underside of the peripheral bead or lip 32 of the nozzle to secure the cap in closed position, as shown in dotted lines in FIG. 2. The cap 16 has a recess 69 in its central portion, said recess having an inner cylindrical side wall 70 adapted to be tightly received within the upper or mouth portion of the nozzle to engage the inner wall of the nozzle, as best seen in dotted lines in FIG. 2. The outer surface of the cylindrical inner wall is beveled as at 71 complementary to the beveled edge 38 of the nozzle so that when the cap is in closed position a seal-tight fit is effected between the cap and the nozzle.

Figure 3:
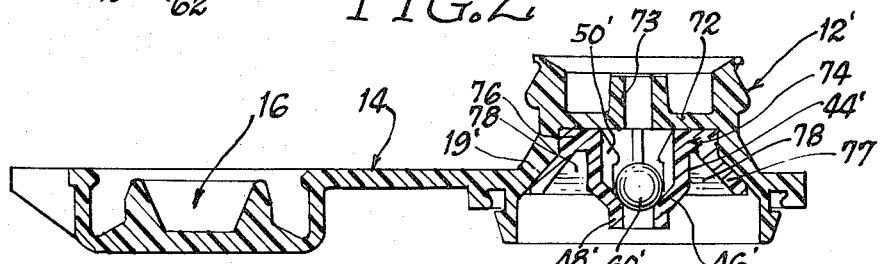
FIG. 3 is a central sectional view of a modification.
Figure 5:
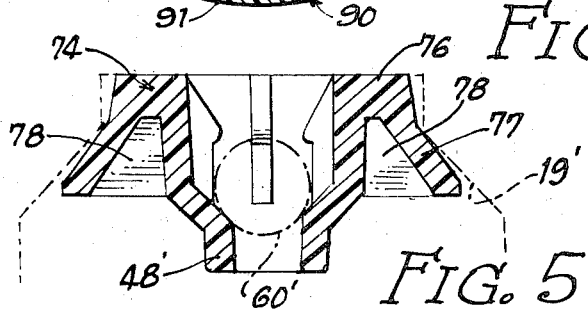
FIG. 5 is a sectional view of the valve cage or valve housing of the FIG. 3 embodiment as it is initially inserted into the nozzle if same is to be spin welded.

FIGS. 3 and 5 Modification

In the FIGS. 3 and 5 embodiment, only that portion of the spout and the valve cage or valve housing which is different from that described with respect to FIGS. 1 and 2 will be described in detail, it being understood that the remaining structure is the same as that previously described.

The nozzle 12 is formed to provide therewithin an annular horizontally extending flat portion 72 extending transversely of the interior of the nozzle below the top thereof, with a centrally upwardly extending tubular portion 73 which forms a pouring spout. The top of the nozzle 12, as well as the spout 73, is closed when the cap 16 is positioned over the nozzle. The valve cage or valve housing generally designated by the numeral 74 is a separately formed or molded component and said valve cage or valve housing includes the tubular portion 44', the conical seat 46', and the tubular lower end 48', as well as the ribs 50' previously described in connection with FIG. 2. The valve housing 74 has an annular top or horizontal portion 76 with a downwardly conical-shaped skirt 77. The valve cage or valve housing 74 is positioned within the interior of the nozzle below the annular horizontal wall 72 and in engagement therewith. The conical skirt 77 is positioned adjacent the tapering wall 19' of the nozzle and is sonically sealed or spin welded to the nozzle so as to be integrated therewith, with the conical skirt 77 of the valve cage abutting the wall 19' of the nozzle.

The operation of the ball valve 60' in the valve cage 74 will be similar to that previously described, however, in addition, the nozzle is provided with the centrally positioned spout 73 so that when the container and the nozzle are inverted the material in the container will flow past the ball valve into the spout and be discharged therefrom.

As shown in FIG. 5, the angle, with respect to a vertical axis, of the skirt 77 of the valve housing 74 when initially inserted into the lower end of the nozzle and before the spin welding is smaller than the angle of the tapering wall 19', however, the skirt 77 and wall 19' are welded to each other in the spin welding process. If the valve cage body 74 of the FIGS. 3 and 5 embodiment is to be sonically sealed to the nozzle, the angle of the conical skirt 77 should be substantially identical to the angle of the wall 19' of the nozzle.

In the FIGS. 3 and 5 embodiment, a plurality of spaced webs, preferably four, designated by the numeral 78 extend between the inside wall of the conical skirt 77 and the tubular body 44'. Said webs are only for the purpose of providing anchorage to a tool which engages said webs to turn the valve cage during spin welding. If the valve cage is secured by means of sonic sealing to the nozzle, the webs 78 may be eliminated.

For sonic sealing of the embodiment shown in FIGS. 3 and 5, the conical skirt 77 may also be eliminated.

FIG. 4 MODIFICATION

Figure 4:
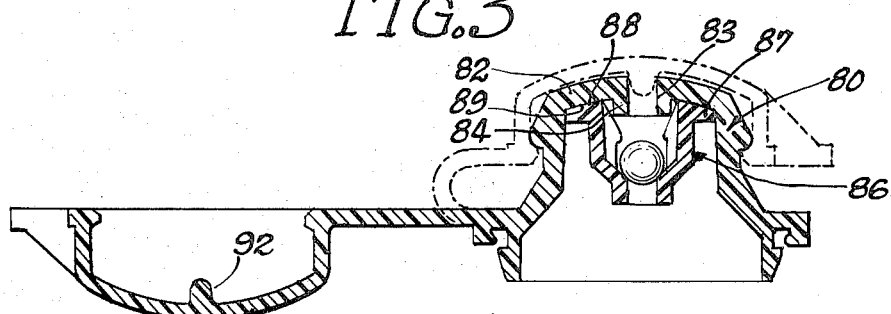
FIG. 4 is a central sectional view of another modification.

FIG. 4 shows a modified nozzle and closure cap with a valve cage or valve housing generally similar to that described in FIG. 3, except that the valve housing shown in FIG. 4 does not have the conical skirt. In the FIG. 4 embodiment the nozzle 80 is provided at the top end with a transversely extending outwardly curved top wall 82, with a central opening 83 and a downwardly extending short tubular portion 84. The valve cage or valve housing generally indicated at 86 has an annular lip or flange 87 at the upper end of the valve cage. The top surface 88 of the flange 87 inclines downwardly complementary to the shape of the inner surface 89 of the top wall 82 of the nozzle 80. The separately formed valve cage 86 of the FIG. 4 embodiment is sonically sealed or spin welded to the interior of the nozzle so as to be integrated with said nozzle. The cap 90 is provided with a dome-shaped top wall 91 having an inwardly extending and centrally located projection 92. As shown in dotted lines in FIG. 4, when the cap is positioned over the nozzle the projection 92 extends into the central opening 83 of the top wall of the nozzle to close the opening thereof.

The closure units shown in the various embodiments, which include the nozzle and the valve cage in FIG. 2, as well as the flexible hinge and the cap, are integrally molded of a plastic material such as polyethylene or similar material, so that there is a combined strength and substantial stiffness with resiliency. The cap can be readily snapped on or off the nozzle repeatedly and the parts resume their original molded shape after temporary distortion. The same is applicable to the embodiments shown in FIGS. 3 and 4, however, the valve cage bodies shown in said embodiments are separately molded of a similar plastic material and are sonically sealed or spin welded to the nozzle, as previously described.

If the valve cage body 86 of the FIG. 4 embodiment is to be spin welded to the nozzle 80, fins similar to the fins 78 of the FIG. 3 embodiment should be incorporated for the same reason as the fins 78.

What is claimed is:

1. In a dispensing nozzle for a container in which the nozzle is to be attached to the container and in which the nozzle has a removable snap-on cap normally sealing the upper end of the nozzle, of resiliently flexible material, said nozzle having an annular enlargement with an annular recess open at the bottom to receive the flanged portion of a container to permanently interlock the nozzle with said container, a valve housing within the nozzle, said valve housing having a tubular portion and a conical valve seat adjacent the lower end and a ball valve supported within the tubular portion and normally seating on said conical seat and closing the lower end of said valve housing to prevent extraneous material from entering from the top of said nozzle, said tubular portion of said valve housing having a plurality of inwardly vertically extending spaced ribs therewithin integrally formed therewith for centering said ball valve with the ribs having a downwardly and inwardly inclined sloping top surface and shaped to provide integrally formed shoulders below the top thereof which serve as a stop to capture and retain the ball valve within the valve housing below the top of the housing but providing passage between the ribs for permitting direct axial passage of the contents between the spaced ribs through said nozzle without a lateral deflection of the flow of the contents when said nozzle is inclined or inverted for spilling position, said ribs being integrally formed with said valve housing and of a resilient material with the sloping top so shaped to permit the initial insertion and passage of the ball valve into the valve housing from the top of the valve housing past the shoulder with the deflection of the ribs.

2. A dispensing nozzle as set forth in claim 1 in which the valve housing is integrally formed with said nozzle.

3. A dispensing nozzle as set forth in claim 1 in which the valve housing is formed separately from the nozzle and in which the valve housing is subsequently permanently secured to said nozzle.

4. A dispensing nozzle as set forth in claim 3 in which the valve housing is secured to the nozzle by sonic sealing.

5. A dispensing nozzle as set forth in claim 3 in which the nozzle has an inclined wall and in which the valve housing has a conical-shaped skirt engaging the inclined inner wall of the nozzle and in which the valve housing is secured to said nozzle by spin welding.

6. A dispensing nozzle as set forth in claim 3 in which the valve housing is secured to the nozzle by spin welding.

7. A dispensing nozzle as set forth in claim 3 in which the nozzle has a horizontally extending wall and a central tubular spout and a valve housing has a top surface engaging said horizontal wall.

8. A dispensing nozzle as set forth in claim 3 in which the nozzle has a top wall with a central opening and in which a cap having a projection fits over the top wall of the nozzle with the projection closing the opening.

* * * * *